US012643771B2

(12) United States Patent
Lee et al.

(10) Patent No.: US 12,643,771 B2
(45) Date of Patent: Jun. 2, 2026

(54) HANGING DEVICE

(71) Applicant: DELTA ELECTRONICS, INC., Taoyuan City (TW)

(72) Inventors: Chen-Hsiu Lee, Taoyuan City (TW); Chih-Jui Chen, Taoyuan City (TW); Chia-Hsing Chen, Taoyuan City (TW); Chiu-Chin Chang, Taoyuan City (TW); Kuan-Lung Wu, Taoyuan City (TW); Li-Hsiu Chen, Taoyuan City (TW); Wen-Yin Tsai, Taoyuan City (TW)

(73) Assignee: DELTA ELECTRONICS, INC., Taoyuan City (TW)

( * ) Notice: Subject to any disclaimer, the term of this patent is extended or adjusted under 35 U.S.C. 154(b) by 1098 days.

(21) Appl. No.: 17/657,630

(22) Filed: Apr. 1, 2022

(65) Prior Publication Data

US 2023/0038997 A1 Feb. 9, 2023

Related U.S. Application Data

(60) Provisional application No. 63/203,870, filed on Aug. 3, 2021.

(30) Foreign Application Priority Data

Jan. 4, 2022 (CN) ......................... 202210001625.4

(51) Int. Cl.
*B66C 1/28* (2006.01)
*B66C 1/34* (2006.01)

(52) U.S. Cl.
CPC . *B66C 1/28* (2013.01); *B66C 1/34* (2013.01)

(58) Field of Classification Search
CPC .............. B66C 1/28; B66C 1/34; B66C 17/04
See application file for complete search history.

(56) References Cited

U.S. PATENT DOCUMENTS

| | | | | |
|---|---|---|---|---|
| 9,169,109 | B2 * | 10/2015 | Iwata | B66F 9/07 |
| 9,586,757 | B2 * | 3/2017 | Kainuma | B65G 1/06 |
| 9,802,801 | B2 * | 10/2017 | Koyama | B66F 9/07 |
| 2002/0172581 | A1 * | 11/2002 | Maney | B60R 9/06 414/631 |

(Continued)

FOREIGN PATENT DOCUMENTS

| | | |
|---|---|---|
| AT | 399306 B | 4/1995 |
| CN | 105540431 A | 5/2016 |

(Continued)

OTHER PUBLICATIONS

CN212151304U—Google Patents English Translation (Year: 2020).*

*Primary Examiner* — Stephen A Vu
(74) *Attorney, Agent, or Firm* — CKC & Partners Co., LLC

(57) ABSTRACT

A hanging device includes an accommodation main body, a sliding assembly, a hook, and the accommodation main body that includes two parallel sidewalls, in which a first vertical path is defined between the two sidewalls. The sliding assembly is movably connected between the two sidewalls to move relative to the main body along the first vertical path. The sliding assembly further includes a sliding rail which defines a second vertical path, and the hook is movably connected to the sliding rail to move relative to the sliding assembly along the second vertical path.

15 Claims, 12 Drawing Sheets

(56) References Cited

U.S. PATENT DOCUMENTS

| | | | | |
|---|---|---|---|---|
| 2010/0172728 | A1* | 7/2010 | Amada .................... | B66F 9/07 414/659 |
| 2022/0032500 | A1 | 2/2022 | Bramberger et al. | |

FOREIGN PATENT DOCUMENTS

| | | | |
|---|---|---|---|
| CN | 108750945 | A | 11/2018 |
| CN | 109809297 | A | 5/2019 |
| CN | 212151304 | U | 12/2020 |
| CN | 213294459 | U | 5/2021 |
| JP | 2004175545 | A | 6/2004 |
| TW | M507420 | U | 8/2015 |
| WO | 2020/201400 | A1 | 10/2020 |

* cited by examiner

HANGING DEVICE

CROSS-REFERENCE TO RELATED APPLICATION

This application claims priority to U.S. Provisional Application Ser. No. 63/203,870, filed on Aug. 3, 2021 and China Application Serial Number 202210001625.4, filed on Jan. 4, 2022, which are herein incorporated by reference in its entirety.

BACKGROUND

Field of Invention

The present invention relates to a hanging device.

Description of Related Art

Generally, operators keep a considerable distance from a hanging device or an object that is to be hung, so the operators may not be able to catch the accurate positional relation between the hanging device and the object that is to be hung. As such, manual mistakes made by the operators would cause the hanging device to collide with the object that is to be hung.

It's well-known that if the hanging device has a long hanging path, the hanging device tends to shake when the hook of the hanging device is moving back and forth relative to the object that is to be hung or when the hook of the hanging device moves to the lowest position. Therefore, hook shaking and colliding with the object that is to be hung would be inevitable even if the operators accurately catch the positional relation between the hanging device and the object that is to be hung.

Thus, how to provide a hanging device free from collision has become a critical issue.

SUMMARY

It is therefore an objective of the present invention to provide a hanging device including an accommodation main body, a sliding assembly, and a hook. The accommodation main body has two parallel sidewalls which define a first vertical path between the two sidewalls. The sliding assembly is movably connected between the two sidewalls and configured to move relative to the accommodation main body along the first vertical path, in which the sliding assembly further includes a sliding rail which defines a second vertical path. The hook is movably connected to the sliding rail and configured to move relative to the sliding assembly along the second vertical path.

In some embodiments of the present invention, the hanging device includes a transportation assembly connected to the accommodation main body and configured to drive the accommodation main body to move along a horizontal plane direction.

In some embodiments of the present invention, the hanging device includes a transportation assembly including a transportation rail and a transportation rod, in which the transportation rod is movably connected to the transportation rail and configured to move relative to the transportation rail along a first horizontal axis. The accommodation main body is movably connected to the transportation rod and configured to move relative to the transportation rod along a second horizontal axis, and the first horizontal axis is substantially perpendicular to the second horizontal axis.

In some embodiments of the present invention, the hanging device includes a rotating assembly connected between the accommodation main body and the transportation assembly, in which the accommodation main body is configured to rotate relative to the transportation assembly around a vertical axis.

In some embodiments of the present invention, the hanging device further includes a fixing rod disposed on the accommodation main body, and the fixing rod is configured to move outside of the positioning groove of the rotating assembly such that the rotating assembly is in a rotatable state. The fixing rod is further configured to move into a positioning groove of the rotating assembly such that the rotating assembly is in a locking state.

In some embodiments of the present invention, the hanging device includes an elastic portion and a stopping portion, the fixing rod is configured to move outside of the positioning groove such that the stopping portion and the accommodation main body collectively press the elastic portion. The fixing rod is configured to move into the positioning groove such that the stopping portion and the accommodation main body collectively release the elastic portion.

In some embodiments of the present invention, the positioning groove includes a plurality of positioning grooves which are arranged to surround a rotation axis of the rotating assembly.

In some embodiments of the present invention, the hanging device further includes a pulley assembly which is disposed on the accommodation main body and configured to drive the hook to move relative to the accommodation main body.

In some embodiments of the present invention, the hanging device further includes a pulley assembly which is disposed on the accommodation main body, and the pulley assembly includes a first pulley and a second pulley, a drive belt, and a rotary handle. The first pulley and the second pulley are coaxially connected, and the drive belt is fastened to the first pulley and the rotary handle. The rotary handle is configured to drive the first pulley, so as to drive the hook to vertically move relative to the accommodation main body.

Another aspect of the present invention is related to a hanging device including an accommodation main body, a sliding assembly, a hook, and a transportation assembly. The accommodation main body has two parallel sidewalls which define a first vertical path between the two sidewalls. The sliding assembly is movably connected between the two sidewalls and configured to move relative to the accommodation main body along the first vertical path, and the sliding assembly further includes a sliding rail which defines a second vertical path. The hook is movably connected to the sliding rail and configured to move relative to the sliding assembly along the second vertical path. The transportation assembly is connected to the accommodation main body and configured to drive the accommodation main body to move along a horizontal plane direction.

Hooks of general hanging devices do not have enough degrees of freedom regarding movement and rotation, so it is hard to hang an object located at an edge or a corner due to the dead angle of the hooks when the operators operates the hanging devices. Also, the hooks of general hanging devices are easy to shake and cause danger when they are extended for too long. Embodiments of the present invention provide a hanging device having more degrees of freedom regarding movement and rotation and also improving the stability for hanging and lifting an object. Especially, the hanging device has a wider hanging operation area to be benefit for reducing the dead angle, so as to help the operators to stably hang and lift an object located at an edge or a corner. The hanging device of the present invention includes a vertical path in two sections to stably lift or lower the hook for grabbing an object. In addition, the hanging device of the present invention further includes a transportation assembly for moving the hook along two horizontal axes which are perpendicular to each other. Furthermore, the hanging device of the present invention further includes a rotating assembly which is configured to rotate the hook around a vertical axis. Therefore, the hook can not only freely move in three-dimensional directions but also rotate freely, and the hanging device of the present invention can use the hook to grab objects under a great degree of freedom, so as to decrease the blind spot about the hanging operation.

It is to be understood that both the foregoing general description and the following detailed description are by examples, and are intended to provide further explanation of the invention as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1:
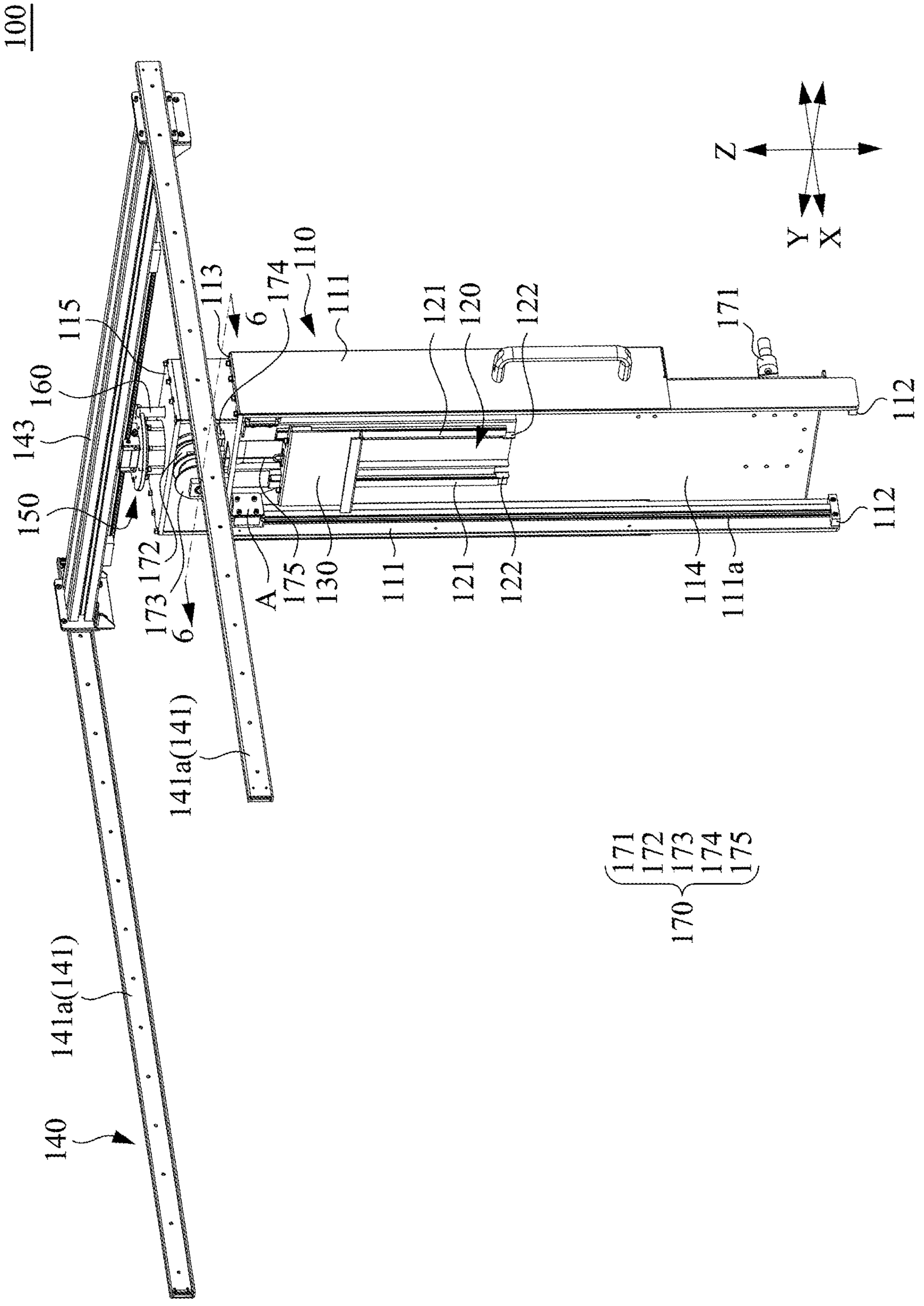
FIGS. 1-3 illustrate isometric views of a hanging device in accordance with some embodiments of the present invention.
Figure 2:
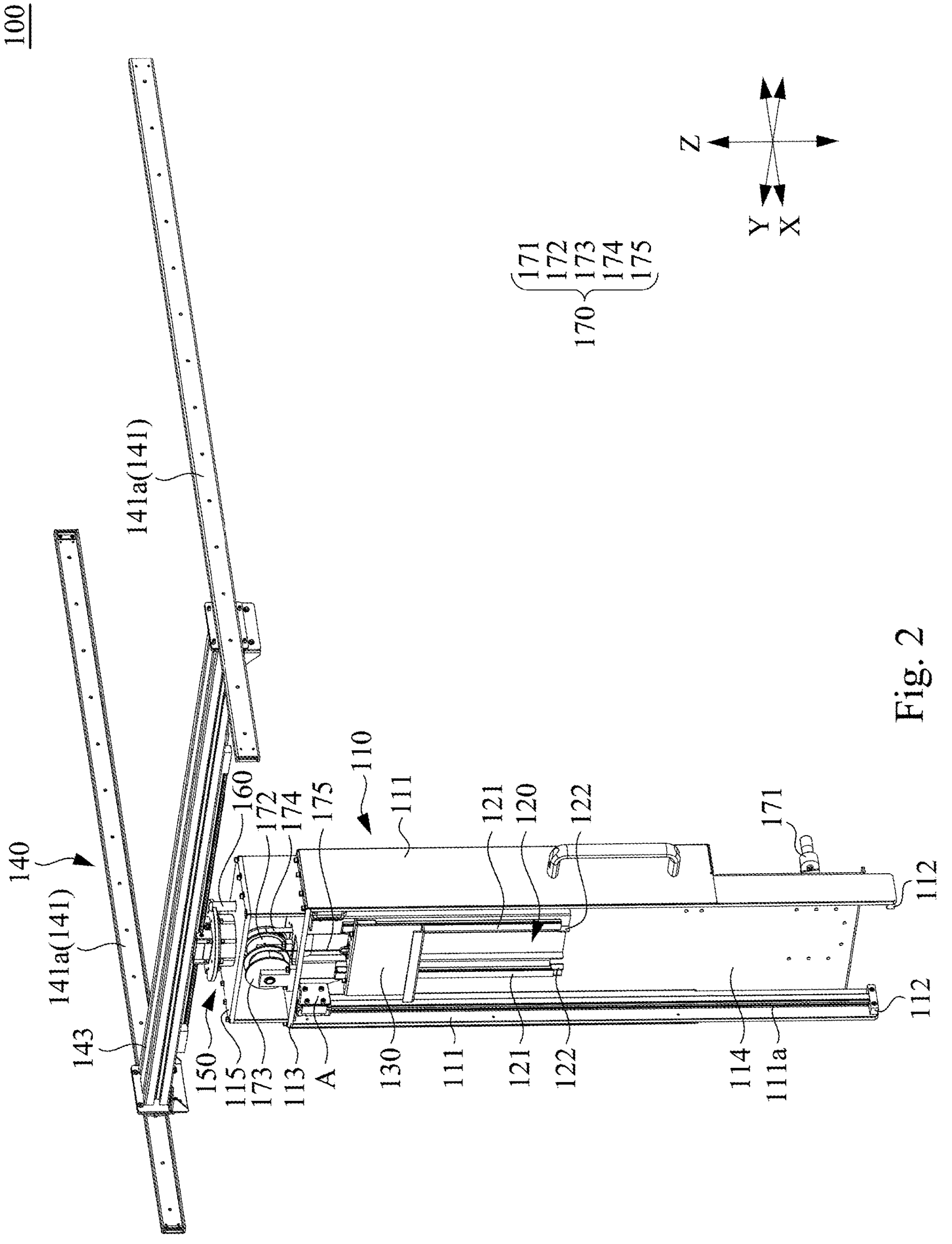
Figure 3:
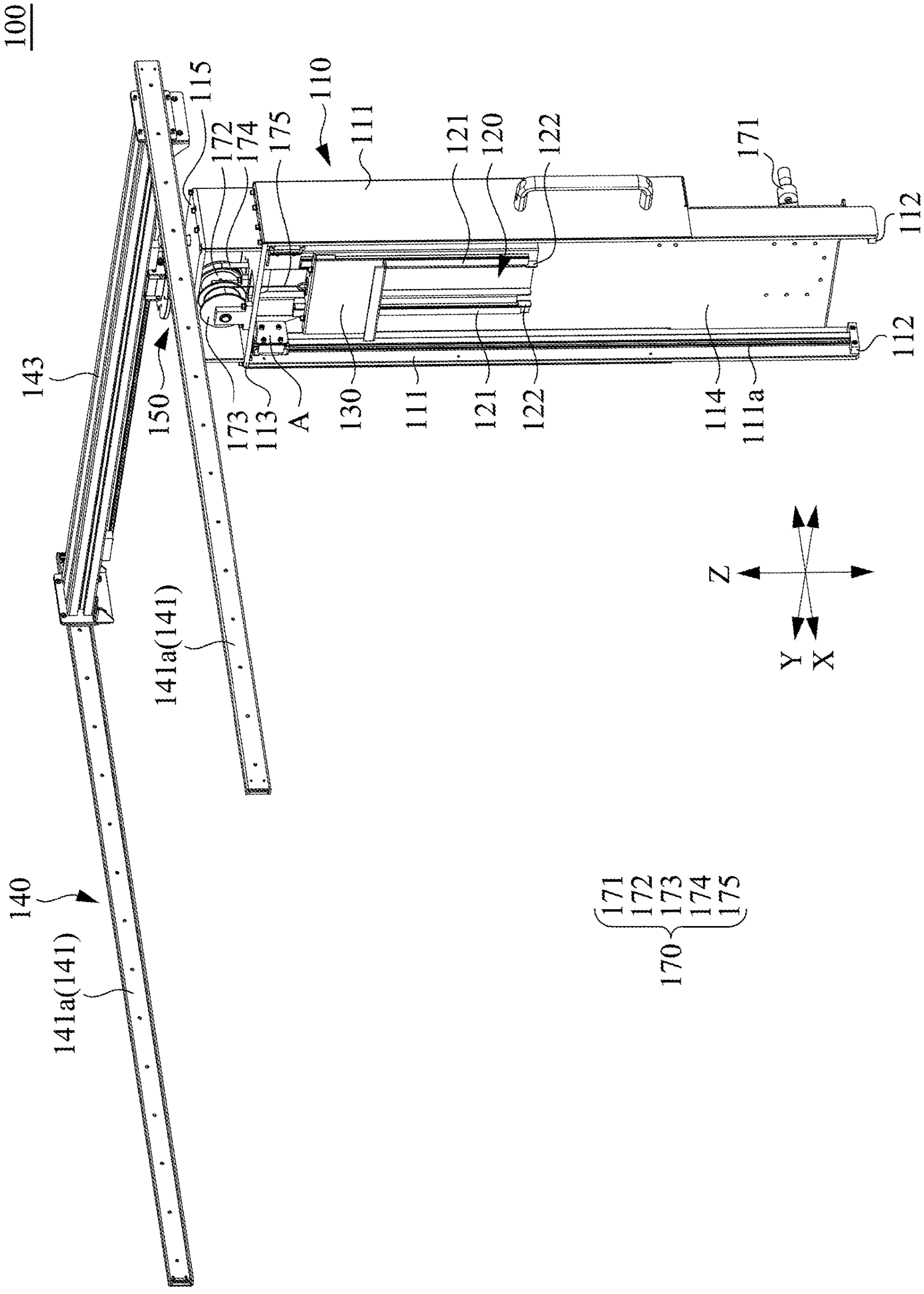
Figure 4:
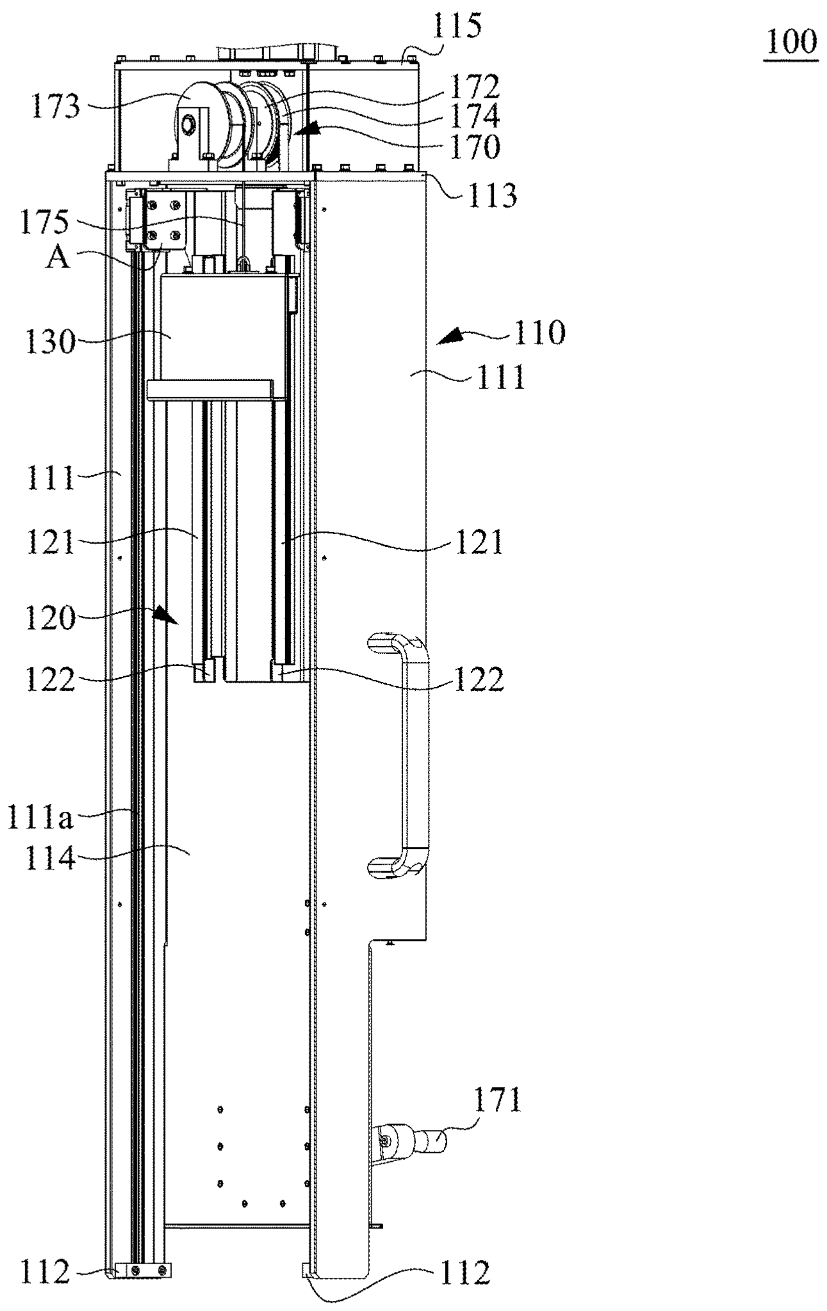
FIG. 4 illustrates a schematic view of a hanging device in accordance with some embodiments of the present invention, in which a hook is at a highest position relative to an accommodation main body.
Figure 5:
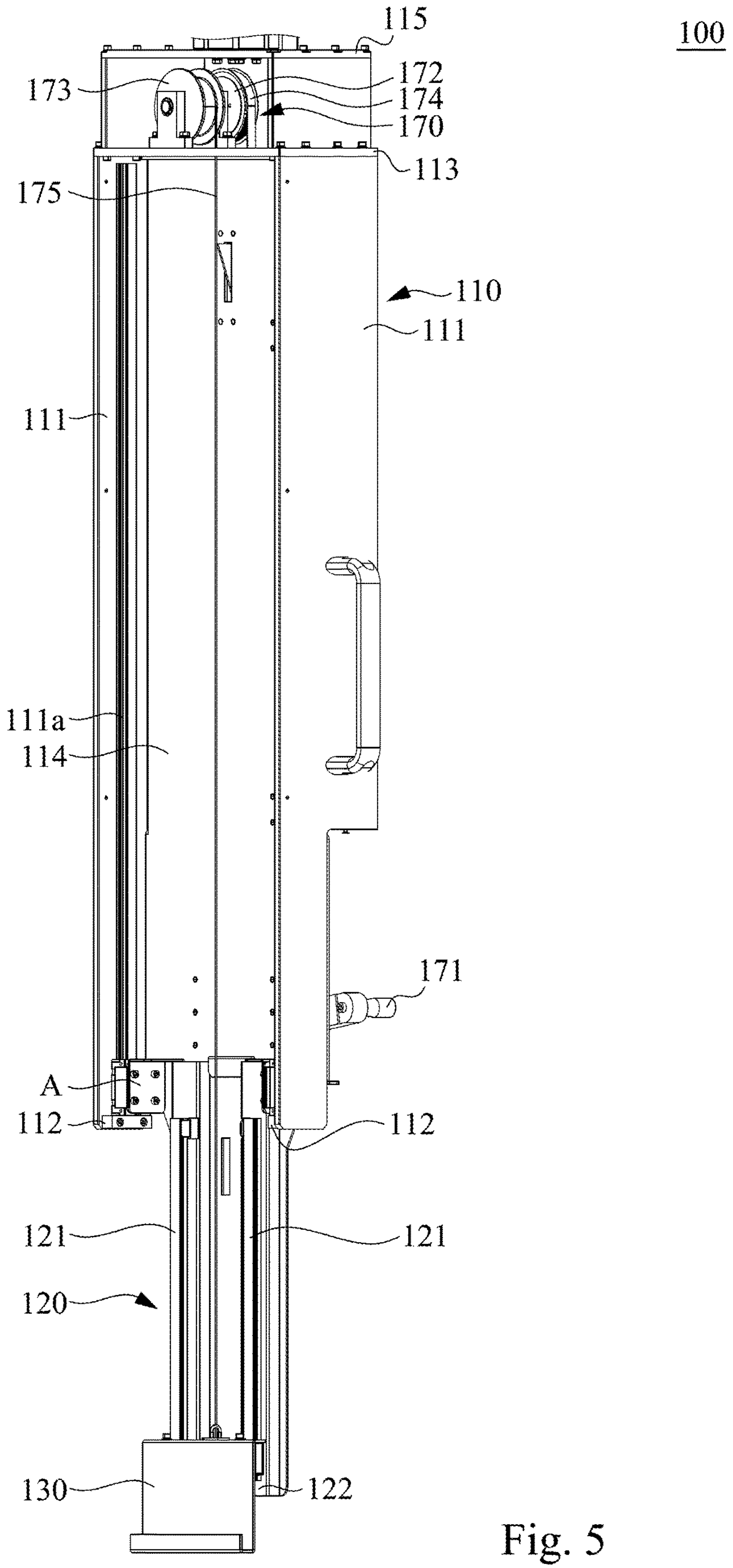
FIG. 5 illustrates a schematic view of a hanging device in accordance with some embodiments of the present invention, in which a hook is at a lowest position relative to an accommodation main body.

Reference will now be made in detail to the present embodiments of the invention, examples of which are illustrated in the accompanying drawings. Wherever possible, the same reference numbers are used in the drawings and the description to refer to the same or like parts.

Please refer to FIGS. 1-5. In some embodiments of the present invention, a hanging device 100 includes an accommodation main body 110, a sliding assembly 120, and a hook 130. The accommodation main body 110 includes two sidewalls 111 which are parallel arranged, in which a first vertical path is defined between the two sidewalls 111. The sliding assembly 120 is movably connected to the two sidewalls 111 such that the sliding assembly 120 moves relative to the accommodation main body 110 along the first vertical path. In addition, the sliding assembly 120 further includes a sliding rail 121 which defines a second vertical path. The hook 130 is movable connected to the sliding rail 121 such that the hook 130 can move relative to the sliding assembly 120 along the second vertical path. Therefore, the hook 130 is able to move relative to the accommodation main body 110 along a vertical axis Z. A vertical moving length, relative to the accommodation main body 110, of the hook 130 includes a length of the first vertical path and a length of the second vertical path, so the hook 130 has a quite long vertical moving length relative to the accommodation main body 110. Accordingly, the hook 130 moves relative to the accommodation main body 110 through the vertical moving length that is divided into two sections being the first vertical path and the second vertical path, thereby improving the structural strength of the hanging device 100, so as to prevent the hook 130 from shaking when the hook 130 is vertically moving.

Specifically, the accommodation main body 110, the sliding assembly 120, and the hook 130 can be made of metal such as alloy, polymer, or a composite material. The accommodation main body 110, the sliding assembly 120, and the hook 130 can be made of aluminum alloy or steel, thereby improving the mechanical strength of the accommodation main body 110, the sliding assembly 120, and the hook 130. The present invention is not limited in this respect.

In some embodiments of the present invention, the accommodation main body 110 includes two block portions 112 which are respectively disposed at bottoms of the two sidewalls 111 such that the sliding assembly 120 moves downwardly relative to the accommodation main body 110 along the vertical axis Z and can be stopped by the block portions 112. The block portions 112 can prevent the sliding assembly 120 from falling outside of the first vertical path of the accommodation main body 110. In addition, each of the two sidewalls 111 includes a linear guiding rail 111*a* extending along the vertical axis Z and being disposed on an interior surface of the corresponding sidewall 111, and the sliding assembly 120 is slidably connected to the linear guiding rail 111*a* such that the sliding assembly 120 can vertically move relative to the accommodation main body 110 along the linear guiding rails 111*a*.

In addition, the hanging device 100 includes a damper A disposed between the sliding assembly 120 and one of the linear guiding rails 111*a*, in which the damper A can prevent the sliding assembly 120 from moving too fast along the vertical axis Z and prevent the sliding assembly 120 from hitting the block portions 112 of the accommodation main body 110. Moreover, the accommodation main body 110 includes a supporting board 114 connected between the two sidewalls 111, in which the two sidewalls 111 and the supporting board 114 collectively accommodate the sliding assembly 120 and the hook 130 such that the two sidewalls 111 and the supporting board 114 protect the sliding assembly 120 and the hook 130 together.

In some embodiments of the present invention, the sliding assembly 120 is substantially T-shaped, and the sliding assembly 120 has two wings respectively movably connected to the linear guiding rails 111*a* of the two sidewalls 111. Since the two sidewalls 111 collectively support the sliding assembly 120, the sliding assembly 120 can stably move relative to the accommodation main body 110. The sliding assembly 120 barely shakes when the sliding assembly 120 is moving along the vertical axis Z. In addition, the sliding assembly 120 includes two sliding rails 121 vertically extend, in which the two sliding rail 121 are parallel to each other and disposed at a front side of the sliding assembly 120. The hook 130 is movably connected to the two sliding rails 121 such that the hook 130 stably moves relative to the sliding assembly 120 along the vertical axis Z. Moreover, the sliding assembly 120 includes two block portions 122 respectively disposed at bottoms of the two sliding rails 121. The hook 130 moves downwardly relative to the sliding assembly 120 along the vertical axis Z, and then the hook 130 stops by the block portions 122 such that the block portions 122 can prevent the hook 130 from falling out of the second vertical path.

In some embodiments of the present invention, the hanging device 100 further includes a transportation assembly 140 configured to drive the accommodation main body 110 to move along a horizontal direction which can be any horizontal direction within a plane defined by a first horizontal axis X and a second horizontal axis Y. The transportation assembly 140 includes a transportation rail 141 and a transportation rod 143, in which the transportation rod 143 is movably connected to the transportation rail 141 and configured to move relative to the transportation rail 141 along the first horizontal axis X. In addition, the accommodation main body 110 is movably connected to the transportation rod 143 and configured to move relative to the transportation rod 143 along the second horizontal axis Y, in which the first horizontal axis X is substantially perpendicular to the second horizontal axis Y, the present invention is not limited in this respect.

More specifically, the transportation rail 141 includes two transportation guiding rods **141*a* spaced apart and parallel to each other, and the two transportation guiding rods 141*a* extend along the first horizontal axis X. Moreover, the transportation rod 143 has two ends respectively movably connected to the two transportation guiding rods 141*a*, and the transportation rod 143 extends along the second horizontal axis Y. As such, the transportation assembly 140 can drive the accommodation main body 110 and the hook 130 to move along the first horizontal axis X and/or the second horizontal axis Y such that the hanging device 100 can drive the hook 130** to freely move in three-dimensional (including X, Y and Z axes) space for grabbing objects.

Please refer to FIGS. 6-9. In some embodiments of the present invention, the hanging device 100 further includes a rotating assembly 150 and a fixing rod 160, in which the fixing rod 160 is disposed at the accommodation main body 110, and the fixing rod 160 can be moved out or inserted into a positioning groove 151 of the rotating assembly 150 such that the rotating assembly 150 is in a rotatable state or a locking state. Specifically, the rotating assembly 150 includes an upper portion 153 and a lower portion155, and the upper portion 153 is rotatably connected to the lower portion 155, the positioning groove 151 is disposed at the upper portion 153 such that the positioning groove 151 and the upper portion 153 can rotate relative to the lower portion 155. In addition, the positioning groove 151 includes a plurality of positioning grooves 151, such as two positioning grooves 151, four positioning grooves 151, six positioning grooves 151, and twelve positioning grooves 151, which surround a rotation axis of the rotating assembly 150. The positioning grooves 151 are disposed at an edge of a bottom plate **153*a* of the upper portion 153 and evenly spaced apart from the rotation axis, and the bottom plate 153*a* which is substantially ring-shaped surrounds periphery sidewalls of the upper portion 153, the bottom plate 153*a* extends along the horizontal plane direction. More specifically, the transportation rod 143 is fixed to the upper portion 153, and the accommodation main body 110 is fixed to the lower portion 155 such that the accommodation main body 110 and the hook 130 can rotate relative to the transportation assembly 140 through the rotating assembly 150. Therefore, the hook 130 of the hanging device 100** can rotate around the vertical axis Z, so as to freely grab an object to be hung.

Figure 6:
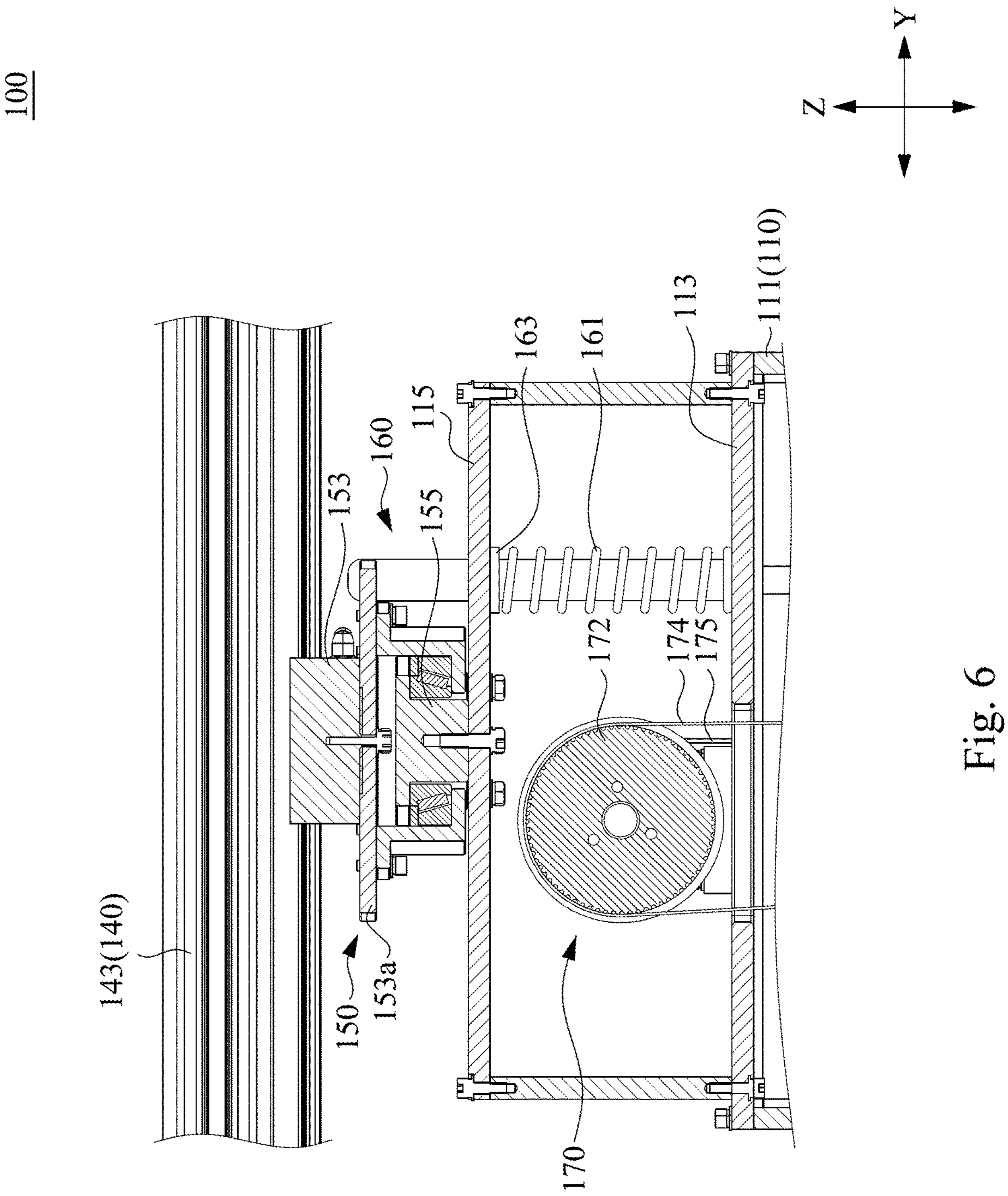
FIG. 6 illustrates a sectional view according to the sectional line 6-6 in FIG. 1.
Figure 7:
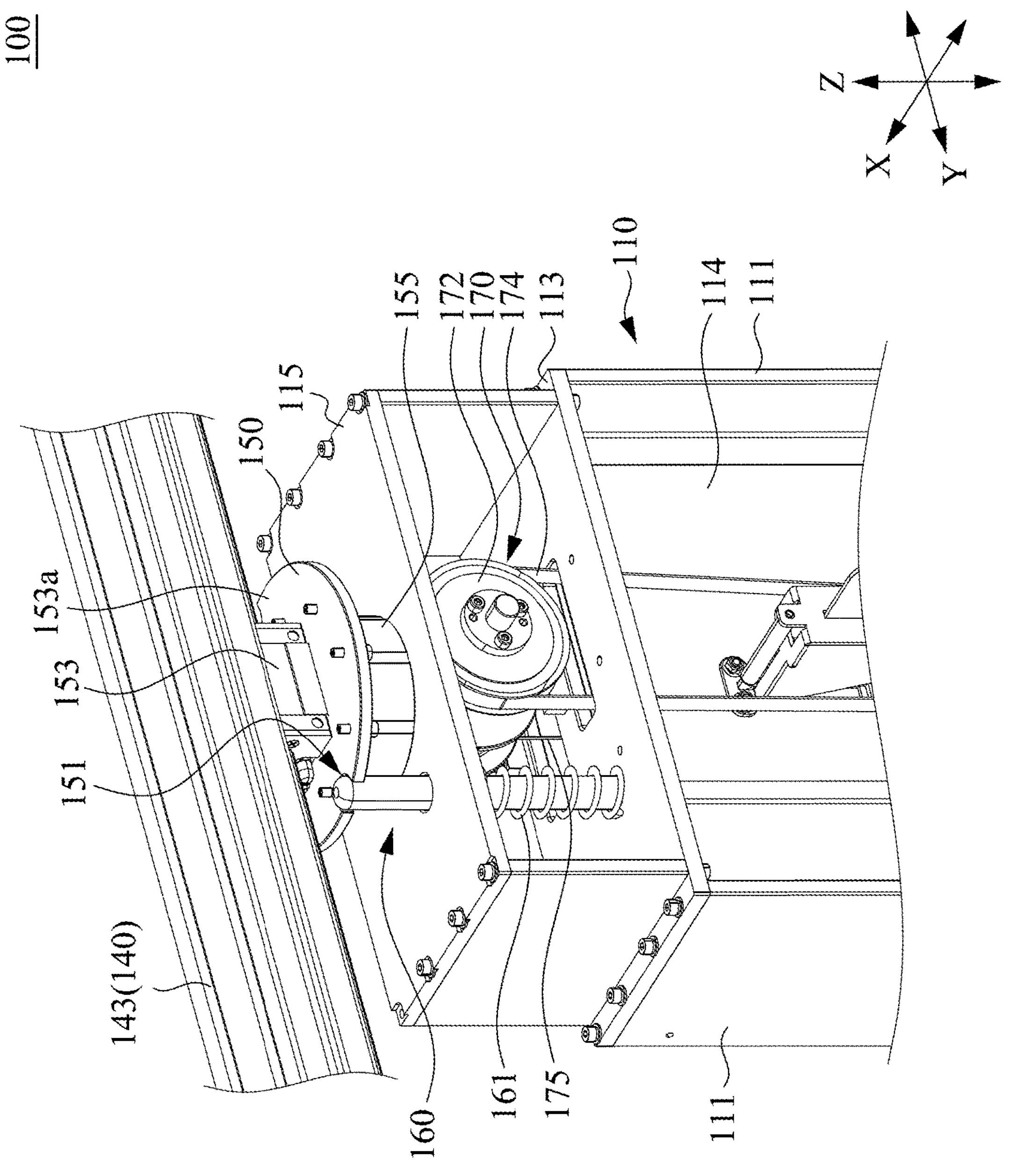
FIGS. 7-8 illustrate partially enlarged views of a hanging device in accordance with some embodiments of the present invention.
Figure 8:
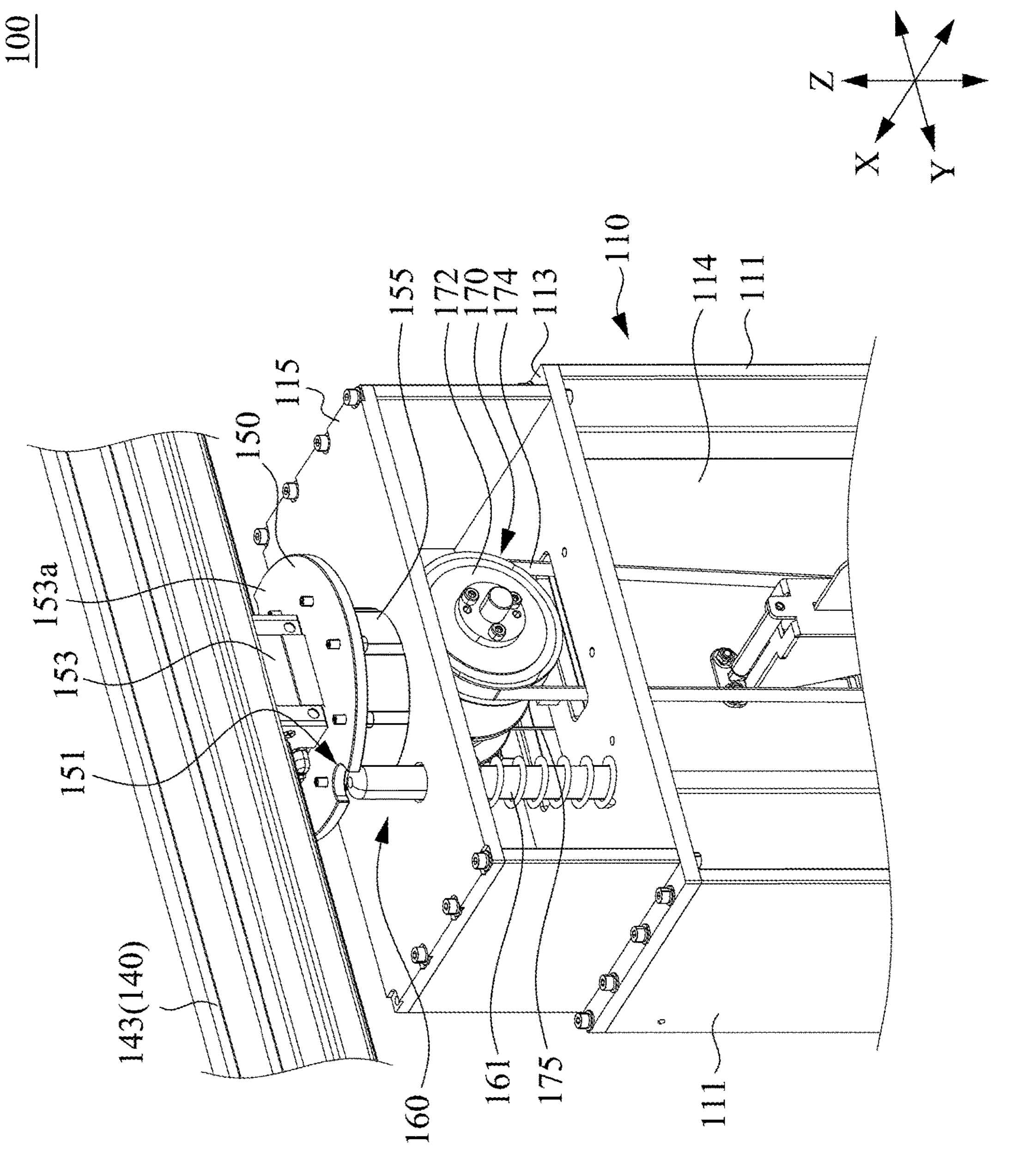
Figure 9:
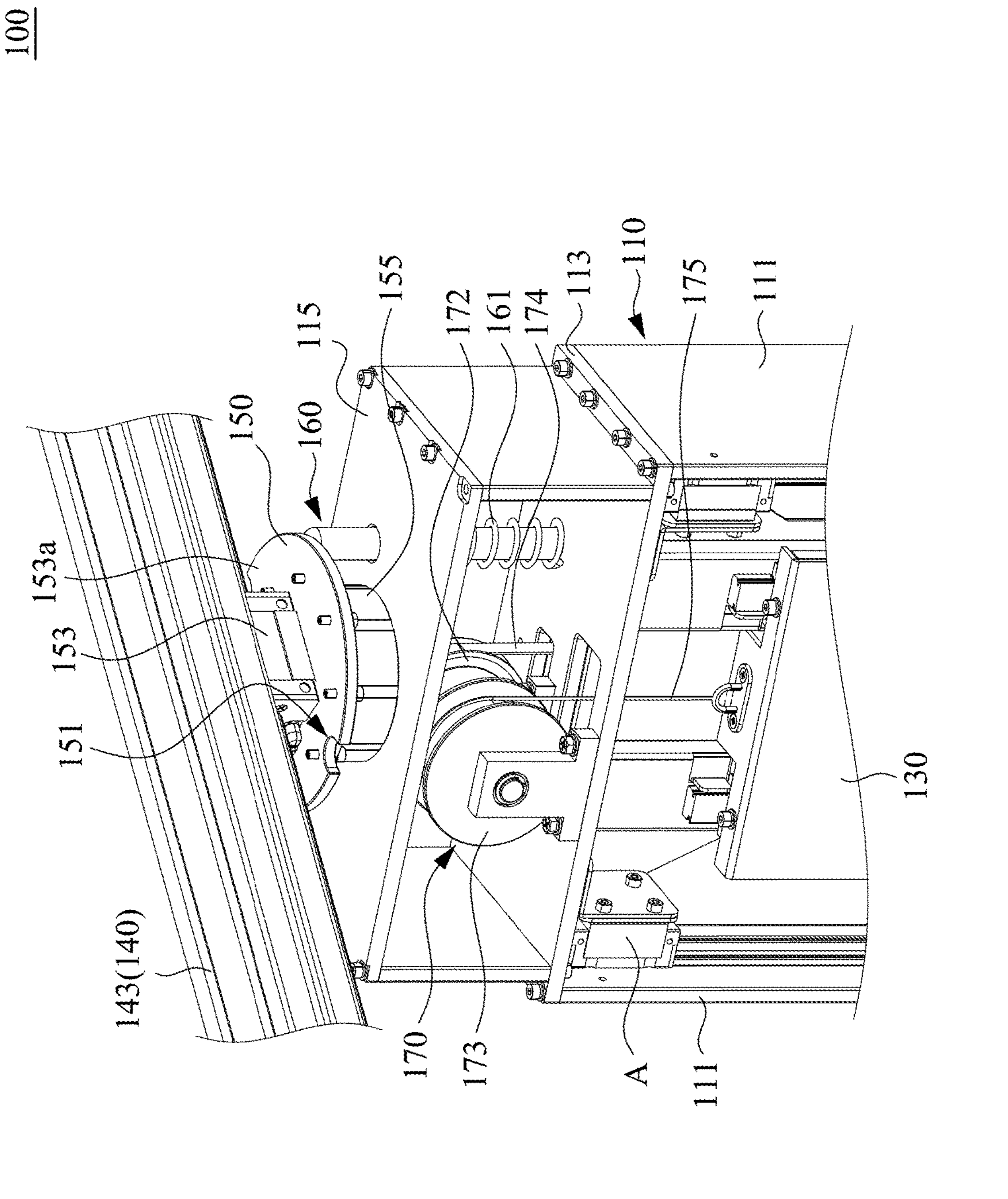
FIG. 9 illustrates a partially enlarged view of a hanging device, in which an accommodation main body of the hanging device rotates to an angle different from that of the hanging devices in FIGS. 7-8.
Figure 10:
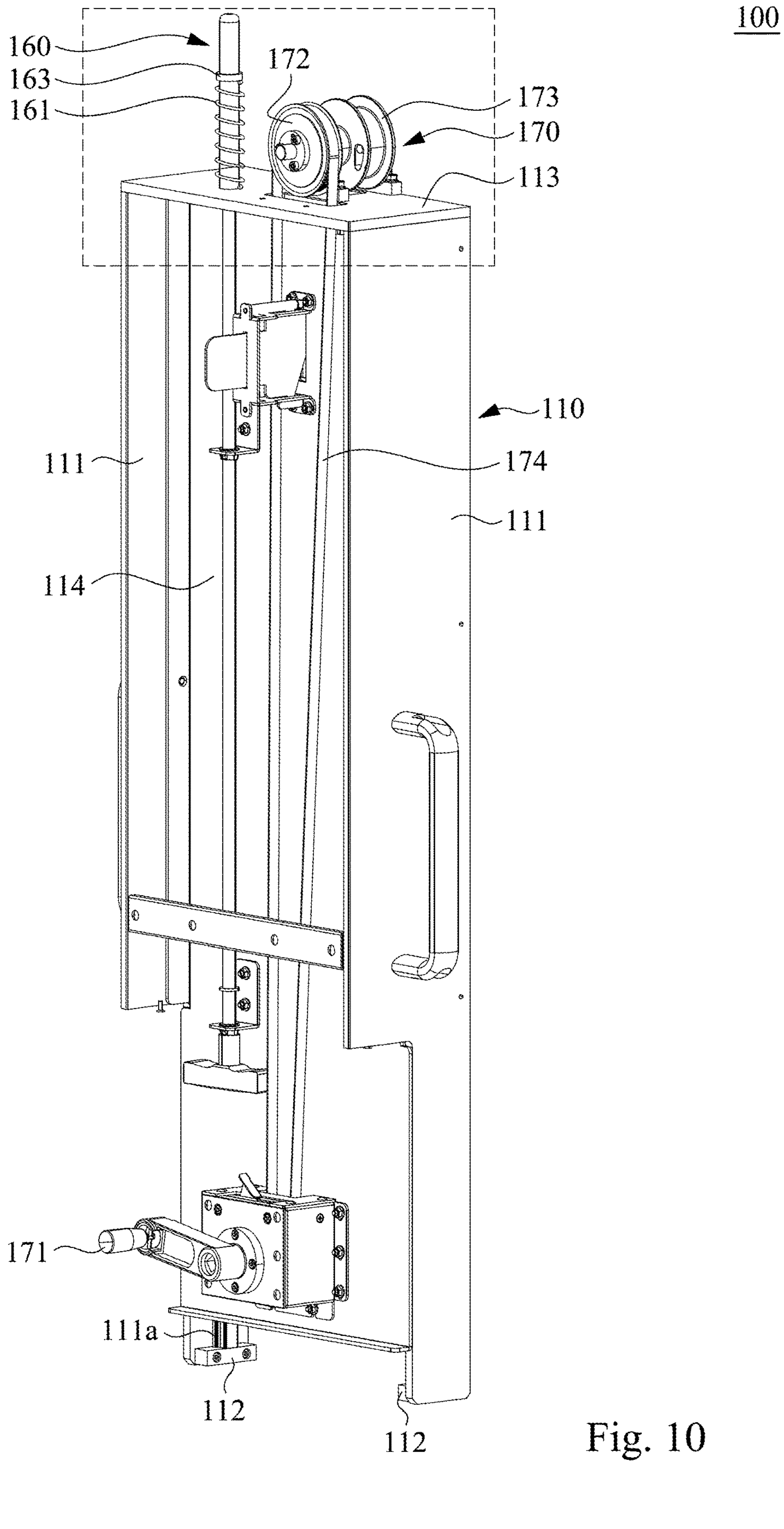
FIG. 10 illustrates a rear view of a hanging device in accordance with some embodiments of the present invention.
Figure 11:
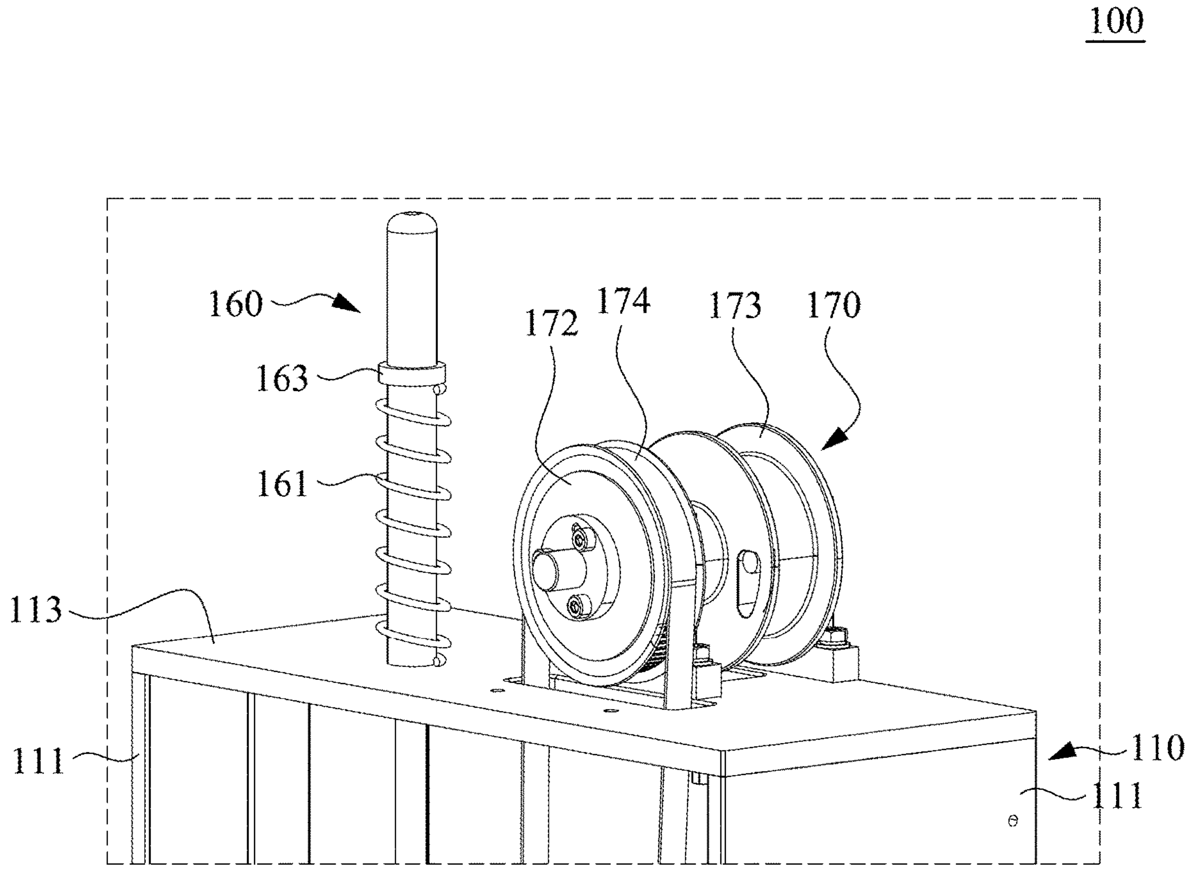
FIG. 11 illustrates a partially enlarged view according to the square S1 in the FIG. 10.
Figure 12:
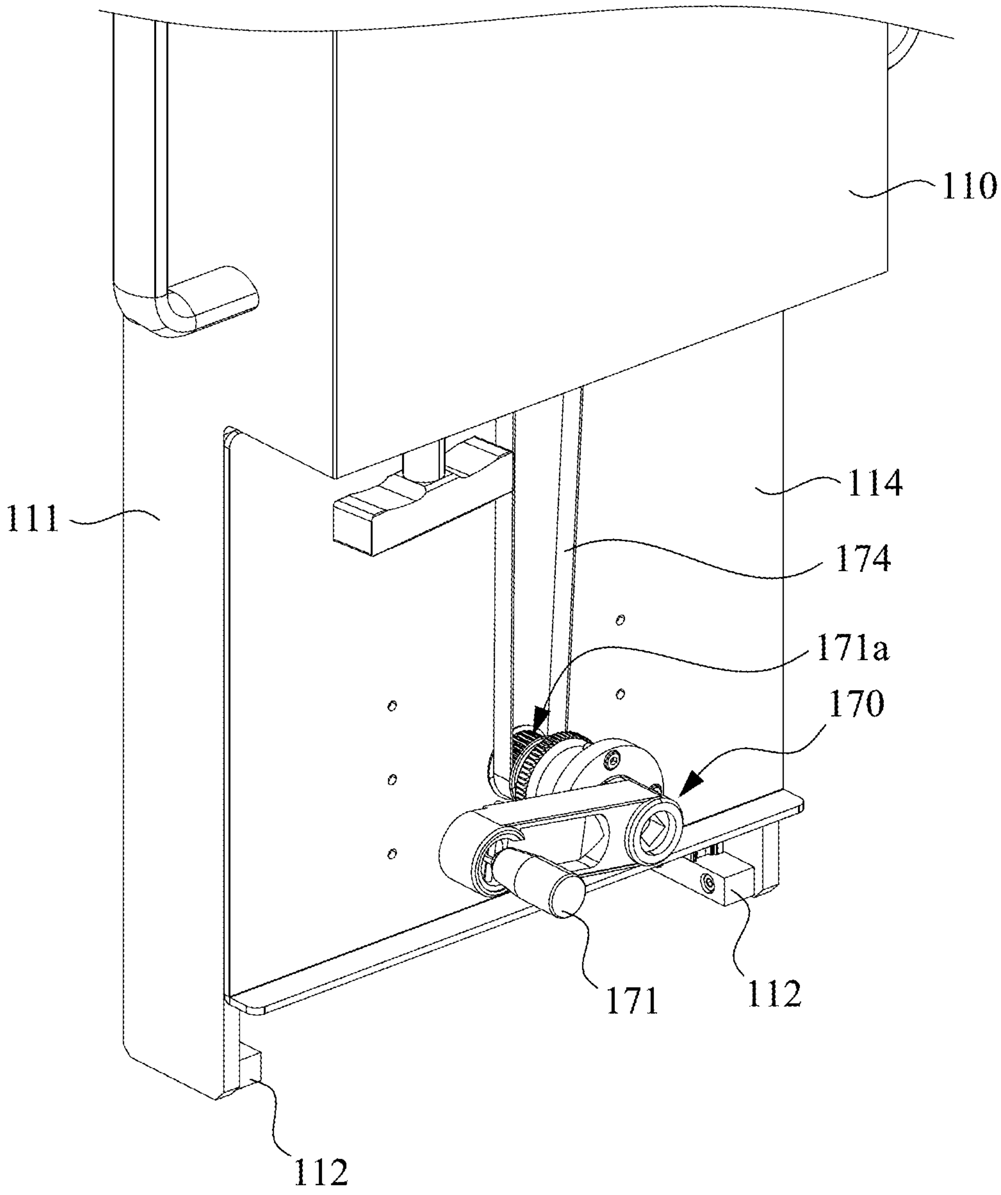
FIG. 12 illustrates a rear view of a hanging device in accordance with some embodiments of the present invention, and a partial housing of a rotary handle is not shown.

In some embodiments of the present invention, the accommodation main body 110 includes an upper board 113 extending along the horizontal plane direction, and the upper board 113 is connected between the two sidewalls 111. The fixing rod 160 includes an elastic portion 161 and a stopping portion 163, and the fixing rod 160 extends through the upper board 113, the elastic portion 161 of the fixing rod 160 is disposed on the upper board 113. The stopping portion 163 is disposed between the bottom plate **153*a* of the upper portion 153 and the upper board 113. Specifically, the elastic portion 161 can be a spring sleeved on the body of the fixing rod 160. In practice, users can pull out the fixing rod 160 from the positioning groove 151 or insert the fixing rod 160 into the positioning groove 151 along the vertical axis Z such that the elastic portion 161 can elastically deform or elastically recover. Referring to FIGS. 8 and 9, the users can apply a downward pulling force along the vertical axis Z to the fixing rod 160, and the fixing rod 160 is moved outside of the positioning groove 151 to make the rotating assembly 150 in the rotatable state such that the upper board 113 of the accommodation main body 110 and the stopping portion 163 can collectively press the elastic portion 161. Referring to FIG. 6, when the users release the aforementioned downward pulling force to align the fixing rod 160 with the positioning groove 151, the elastic portion 161 is elastically recovered to generate an elastic force pushing the fixing rod 160 to be inserted into the positioning groove 151 such that the rotating assembly 150** in in the locking state.

Please refer to FIGS. 4-6 and 10-12. In some embodiments of the present invention, the hanging device 100 further includes a pulley assembly 170, and the accommodation main body 110 further includes a cap 115 disposed on the upper board 113. The pulley assembly 170 is configured to drive the hook 130 to vertically move relative to the accommodation main body 110. The pulley assembly 170 includes a rotary handle 171, a first pulley 172, a second pulley 173, a drive belt 174, and a wire rope 175, and the first pulley 172 and the second pulley 173 are coaxially connected, the drive belt 174 is fastened to the first pulley 172 and the rotary handle 171. The wire rope 175 is fastened between the second pulley 173 and the hook 130, and the rotary handle 171 is configured to drive the second pulley 173 to rotate and drive the hook 130 to move relative to the accommodation main body 110 along the vertical axis Z.

In detail, the rotary handle 171 and the drive belt 174 are disposed at a rear side of the supporting board 114, and the hook 130 is disposed at a front side of the supporting board 114. In addition, the first pulley 172 and the second pulley 173 are fixed pulleys located above the upper board 113, and the first pulley 172 and the second pulley 173 are above the rotary handle 171. The cap 115 accommodates the first pulley 172 and the second pulley 173, and the second pulley 173 is disposed directly above the hook 130 and at the front side of the supporting board 114. The first pulley 172 is disposed directly above the rotary handle 171 and at the rear side of the supporting board 114. In addition, the rotary handle 171 further includes a third pulley **171*a*, and the drive belt 174 is fastened to the first pulley 172 and the third pulley 171*a*. As such, the users can easily rotate the rotary handle 171 to drive the hook 130 to move relative to the accommodation main body 110 through the drive belt 174 along the vertical axis Z. In addition, the rotary handle 171 is below the first pulley 172 and the second pulley 173, and thus the users can operate the rotary handle 171 at a lower position, so as to drive the hook 130** to hang the object to be hung.

To sum up, in embodiments of the present invention, a hanging device capable of improving the degrees of freedom regarding movement and rotation of a hook is provided, and the hanging device is benefit for improving stability when the hanging device is lifting the object to be hung. The hanging device includes a vertical path in two sections through which the hook is stably lifted or lowered when grabbing the object to be hung. Moreover, the hanging device further includes a transportation assembly configured to move the hook along two horizontal axes perpendicular to each other. The hanging device further includes a rotating assembly which is configured to rotate the hook around the vertical axis relative to the transportation assembly. Therefore, the hook can not only freely move in three-dimensional directions but also rotate freely, and the hanging device of the present invention can use the hook to grab objects under a great degree of freedom, so as to decrease the blind spot about the hanging operation.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A hanging device, comprising:

an accommodation main body having two parallel sidewalls which define a first vertical path between the two parallel sidewalls;

a sliding assembly movably connected between the two parallel sidewalls and configured to move relative to the accommodation main body along the first vertical path, wherein the sliding assembly further includes a sliding rail which defines a second vertical path;

a hook movably connected to the sliding rail and configured to move relative to the sliding assembly along the second vertical path;

a transportation assembly connected to the accommodation main body and configured to drive the accommodation main body to move along a horizontal direction; and a rotating assembly connected between the accommodation main body and the transportation assembly, such that the accommodation main body rotates relative to the transportation assembly around a vertical axis.

2. The hanging device of claim 1, wherein the transportation assembly includes a transportation rail and a transportation rod, wherein the transportation rod is movably connected to the transportation rail and configured to move relative to the transportation rail along a first horizontal axis; the accommodation main body is movably connected to the transportation rod and configured to move relative to the transportation rod along a second horizontal axis, and wherein the first horizontal axis is substantially perpendicular to the second horizontal axis.

3. The hanging device of claim 2, further comprising a fixing rod, wherein the fixing rod is disposed on the accommodation main body, the fixing rod is configured to move outside of at least one positioning groove of the rotating assembly such that the rotating assembly is in a rotatable state, and the fixing rod is configured to move into the at least one positioning groove of the rotating assembly such that the rotating assembly is in a locking state.

4. The hanging device of claim 3, wherein the fixing rod comprises an elastic portion and a stopping portion, the fixing rod is configured to move out from the at least one positioning groove such that the stopping portion and the accommodation main body collectively press the elastic portion, and wherein the fixing rod is configured to move into the at least one positioning groove such that the stopping portion and the accommodation main body collectively release the elastic portion.

5. The hanging device of claim 3, wherein the at least one positioning groove includes a plurality of positioning grooves which are arranged to surround a rotation axis of the rotating assembly.

6. The hanging device of claim 1, further comprising a fixing rod, wherein the fixing rod is disposed on the accommodation main body, the fixing rod is configured to move outside of at least one positioning groove of the rotating assembly such that the rotating assembly is in a rotatable state, and the fixing rod is configured to move into the at least one positioning groove of the rotating assembly such that the rotating assembly is in a locking state.

7. The hanging device of claim 6, wherein the fixing rod comprises an elastic portion and a stopping portion, the fixing rod is configured to move out from the at least one positioning groove such that the stopping portion and the accommodation main body collectively press the elastic portion, and wherein the fixing rod is configured to move into the at least one positioning groove such that the stopping portion and the accommodation main body collectively release the elastic portion.

8. The hanging device of claim 6, wherein the at least one positioning groove includes a plurality of positioning grooves which are arranged to surround a rotation axis of the rotating assembly.

9. The hanging device of claim 1, further comprising a pulley assembly which is disposed on the accommodation main body and configured to drive the hook to move relative to the accommodation main body.

10. The hanging device of claim 1, further comprising a pulley assembly which is disposed on the accommodation main body, wherein the pulley assembly comprises a first pulley, a second pulley, a drive belt, and a rotary handle, wherein the first pulley and the second pulley are coaxially connected, the drive belt is fastened to the first pulley and the rotary handle, and wherein the rotary handle is configured to drive the first pulley, so as to drive the hook to vertically move relative to the accommodation main body.

11. A hanging device, comprising:

an accommodation main body having two parallel sidewalls which define a first vertical path between the two parallel sidewalls;

a sliding assembly movably connected between the two parallel sidewalls and configured to move relative to the accommodation main body along the first vertical path, wherein the sliding assembly further includes a sliding rail which defines a second vertical path;

a hook movably connected to the sliding rail and configured to move relative to the sliding assembly along the second vertical path; and a transportation assembly connected to the accommodation main body and configured to drive the accommodation main body to move along a horizontal plane direction, wherein the transportation assembly includes a transportation rail and a transportation rod, wherein the transportation rod is movably connected to the transportation rail and configured to move relative to the transportation rail along a first horizontal axis, the accommodation main body is movably connected to the transportation rod and configured to move relative to the transportation rod along a second horizontal axis.

12. The hanging device of claim 11, further comprising a rotating assembly.

13. The hanging device of claim 12, further comprising a fixing rod disposed on the accommodation main body, wherein the fixing rod is configured to move outside of a positioning groove of the rotating assembly such that the rotating assembly is in a rotatable state, and the fixing rod is configured to move into the positioning groove of the rotating assembly such that the rotating assembly is in a locking state.

14. The hanging device of claim 13, wherein the fixing rod comprises an elastic portion and a stopping portion, the fixing rod is configured to move outside of the positioning groove such that the stopping portion and the accommodation main body collectively press the elastic portion, and wherein the fixing rod is configured to move into the positioning groove such that the stopping portion and the accommodation main body collectively release the elastic portion.

15. The hanging device of claim 11, further comprising a pulley assembly which is disposed on the accommodation main body and configured to drive the hook to move relative to the accommodation main body.

* * * * *